United States Patent [19]

Hayward et al.

[11] Patent Number: 4,930,595
[45] Date of Patent: Jun. 5, 1990

[54] METHOD AND APPARATUS FOR DETERMINING THE PROFILE OF A SUBTERRANEAN PASSAGE

[75] Inventors: Alan G. Hayward, Dowling; Lauri C. Gregg, Hanmer; Aurele L. Dutrisac, Belzzard Valley; Jack J. Joliat, Blezzard Valley, all of Canada

[73] Assignee: Falconbridge Limited, Toronto, Canada

[21] Appl. No.: 108,504

[22] Filed: Oct. 14, 1987

[30] Foreign Application Priority Data

Oct. 14, 1986 [CA] Canada .................................. 520432

[51] Int. Cl.⁵ ............................................. G01V 1/40
[52] U.S. Cl. .................................... 181/104; 181/105; 367/86; 33/304; 73/151
[58] Field of Search .................. 181/104, 105; 367/35, 367/86, 99, 103, 104; 73/151, 152; 175/40, 50; 33/302, 304

[56] References Cited

U.S. PATENT DOCUMENTS

| | | | |
|---|---|---|---|
| Re. 31,074 | 11/1982 | Nolte | 73/151 |
| 3,961,683 | 6/1976 | Deligniers | 181/102 |
| 3,984,627 | 10/1976 | Galerne | 33/304 |
| 4,463,378 | 7/1984 | Rambow | 358/112 |
| 4,694,437 | 9/1987 | Hanson | 367/27 |

FOREIGN PATENT DOCUMENTS 1806554  5/1970  Fed. Rep. of Germany .

OTHER PUBLICATIONS

Patent Abstracts of Japan, vol. 10, No. 74 (P-439), [2131], 25th Mar. 1986; Kensetsu K.K.
Patent Abstracts of Japan, vol. 9, No. 72 (P345), [1795], 2nd Apr. 1985; Kensetsu K.K.

Primary Examiner—Charles T. Jordan
Assistant Examiner—J. Woodrow Eldred
Attorney, Agent, or Firm—Rogers, Bereskin & Parr

[57] ABSTRACT

A method and apparatus for remotely determining the profile of an inaccessible subterranean passage for example in a mine. An instrument pod is moved through the passage in steps. At each step, a rangefinder scans the wall of the passage and provides to a remote monitor, range measurements from which a profile can be determined. The pod also carries clinometers for determining the orientation of the pod during each profile measurement. The pod also carries a television camera and lights so that the wall of the passage can be visually inspected.

16 Claims, 5 Drawing Sheets

METHOD AND APPARATUS FOR DETERMINING THE PROFILE OF A SUBTERRANEAN PASSAGE

FIELD OF THE INVENTION

This invention relates generally to a method and apparatus for determining the profile of a subterranean passage, for example in a mine.

BACKGROUND OF THE INVENTION

In an ore mine, passages called "passes" or "raises" normally extend between different levels of the mine and act as conduits for material that is to be conveyed from an upper level to a lower level by gravity. For example, ore mined at upper levels of the mine may travel down an "ore pass" to a crusher at a lower level.

Over a period of time, ore tumbling down the pass causes the wall of the pass to deteriorate. Chunks of waste material break off from the wall and fall down the pass. This is referred to as "sloughing". Where large chunks of material break away from the wall of a pass, they can even block or damage the crusher and interupt production of the mine. Sloughing can eventually lead to collapse of the pass. Seismic activity can also have a destructive effect on the condition of a pass.

For all of these reasons, it would be desirable to be able to monitor the condition of the wall of the pass from time to time. However, the passes are generally inaccessible and cannot be visually inspected. Attempts have been made to determine the contour of a pass (and thereby assess its condition) by drilling into the pass from adjacent mine shafts at several locations and measuring the depth of material through which the drill has cut at each location. However, such techniques are extremely expensive and unreliable. As far as is known, the technology to accurately determine the contour or profile of a pass has not been developed.

An object of the present invention is therefore to provide a method and apparatus for determining the profile of a subterranean passage such as an ore or waste material pass in a mine.

SUMMARY OF THE INVENTION

In one aspect the invention provides a method of remotely determining the profile of a subterranean passage by the steps of:

positioning in the passage at a known location along its length, an instrument pod that is capable of being moved along the passage and that includes: rangefinder means capable of determining the distances from a defined longitudinal axis of the pod of multiple points on the internal wall of the passage lying in a common plane normal to said axis, and of providing an output signal indicative of said distances and representing the profile of the passage in said plane; and, clinometer means capable of providing an output signal indicative of the orientation of the pod in the passage;

remotely monitoring the output signals of the rangefinder means and clinometer means;

generating from the output signal of the rangefinder means a visual representation of the profile of the passage at said known location;

moving the pod to successive subsequent locations each at a known distance along the passage from a preceding location; and, at each said subsequent location, generating a visual representation of the profile of the passage from the rangefinder output signal.

In other words, a series of profiles are generated at known positions spaced along the length of the passage. The profiles themselves indicate directly the shape of the passage at the particular locations monitored and indicate the condition of the pass. By comparing or consolidating the profile, it is also possible to obtain a longitudinal profile.

Another aspect of the invention provides an apparatus for remotely determining the profile of a subterranean passage, comprising:

an instrument pod that is capable of being moved along the passage and that includes: rangefinder means capable of determining the distances from a defined longitudinal axis of the pod of multiple points on the internal wall of the passage lying in a common plane normal to said axis, and of providing an output signal indicative of said distances and representing the profile of the passage in said plane; and clinometer means capable of providing an output signal indicative of the orientation of the pod in the passage in use; and, means for remotely monitoring the output signals of the rangefinder means and the clinometer means.

The output signals from the rangefinder means and the clinometer means can be manually recorded and used to generate a profile of the passage at each location of the pod along the passage. Preferably, however, at least the output signals of the rangefinder means are automatically recorded.

The pod is preferably also provided with a television (TV) camera and suitable lighting so that the wall of the passage can also be visually inspected. The camera will transmit signals to a remote monitor. A video recorder will preferably also be provided so that the signals transmitted by the TV camera can be preserved.

Signals from the rangefinder means and clinometer means and also from the TV camera (where provided) are conveniently transmitted by an umbilical cable or cables extending from the pod to an appropriate remote location, typically near an entrance to the passage. Alternatively, it probably would be possible to transmit those signals without direct cable connection.

BRIEF DESCRIPTION OF THE DRAWINGS

In order that the invention may be more clearly understood, reference will now be made to the accompanying drawings which illustrate a particular preferred embodiment of the invention by way of example, and in which.

DESCRIPTION OF THE PREFERRED EMBODIMENT

Figure 1:
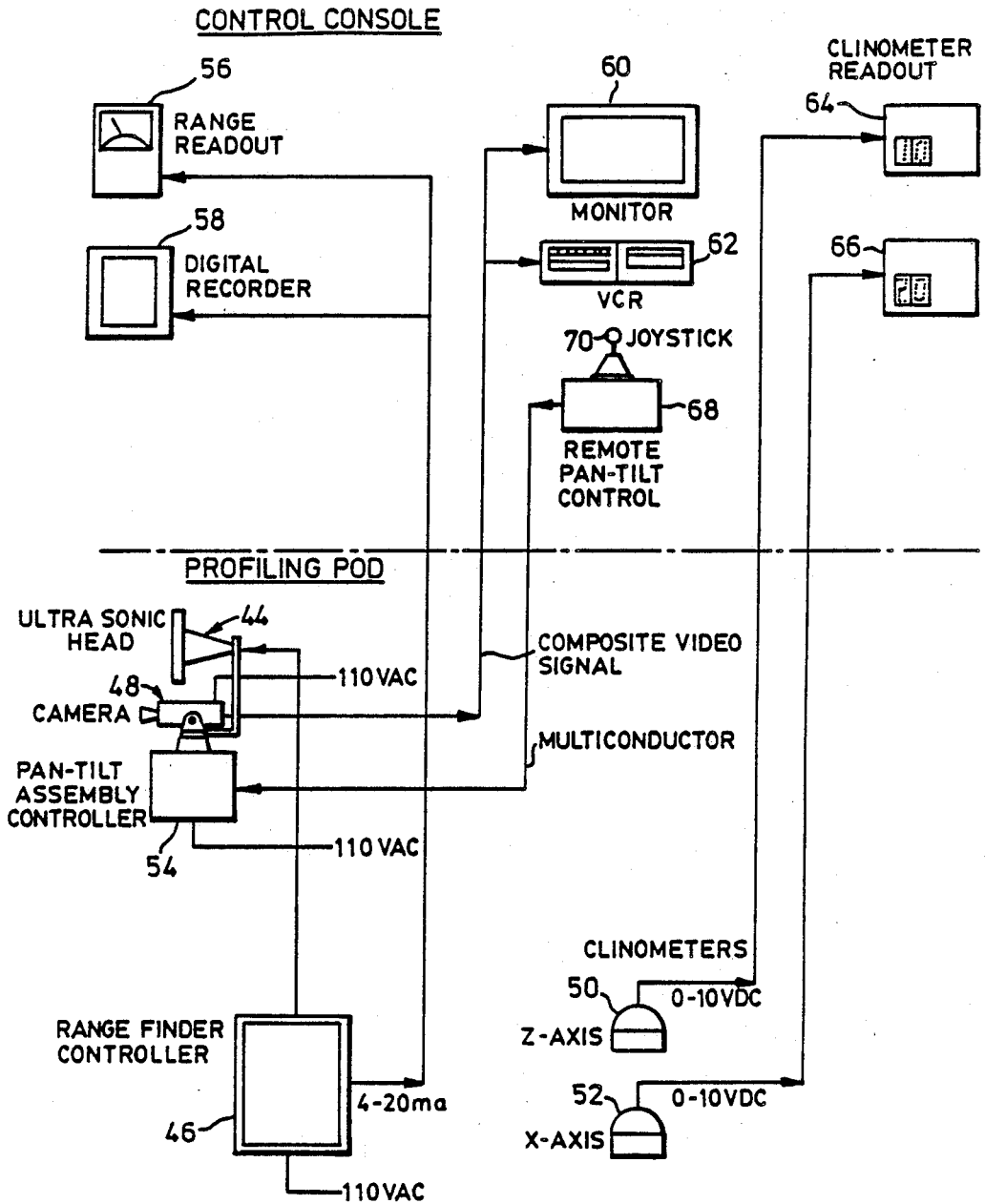
FIG. 1 is a diagrammatic illustration of the principal electronic components of the apparatus provided by the invention.
Figure 2:
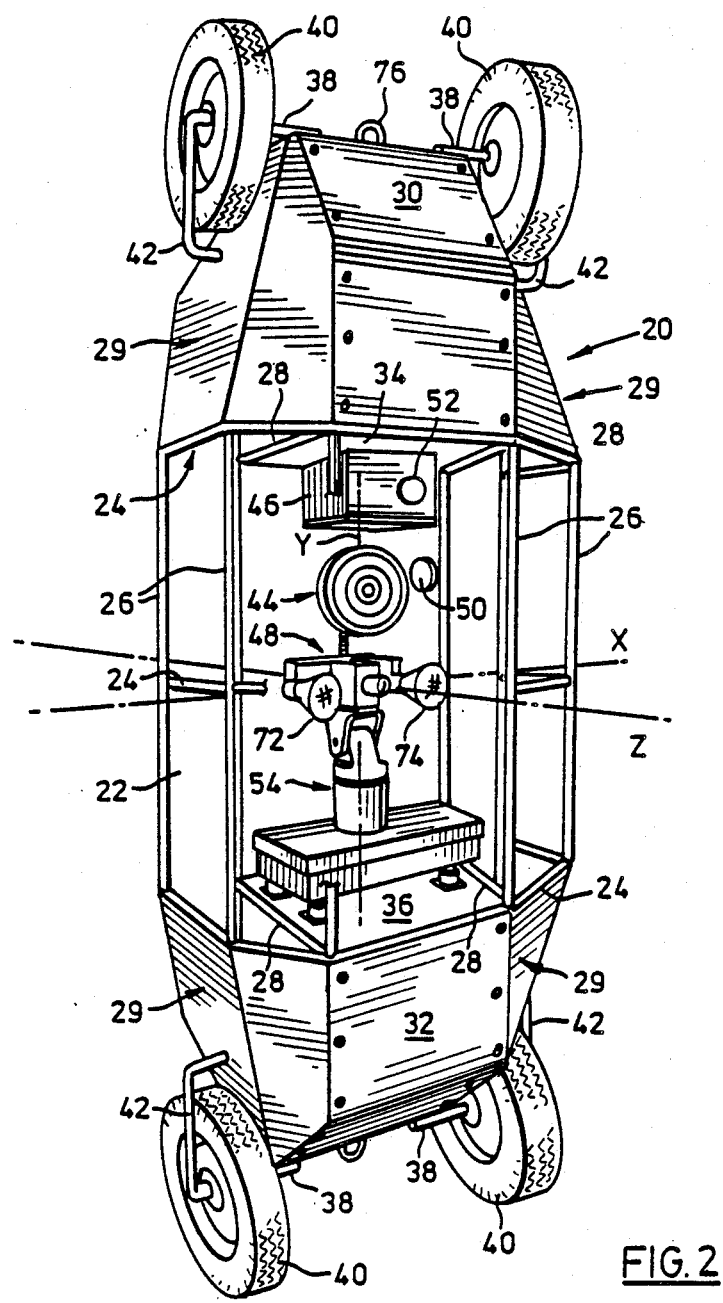
FIG. 2 is a perspective view of the instrument pod of the apparatus.
Figure 3:
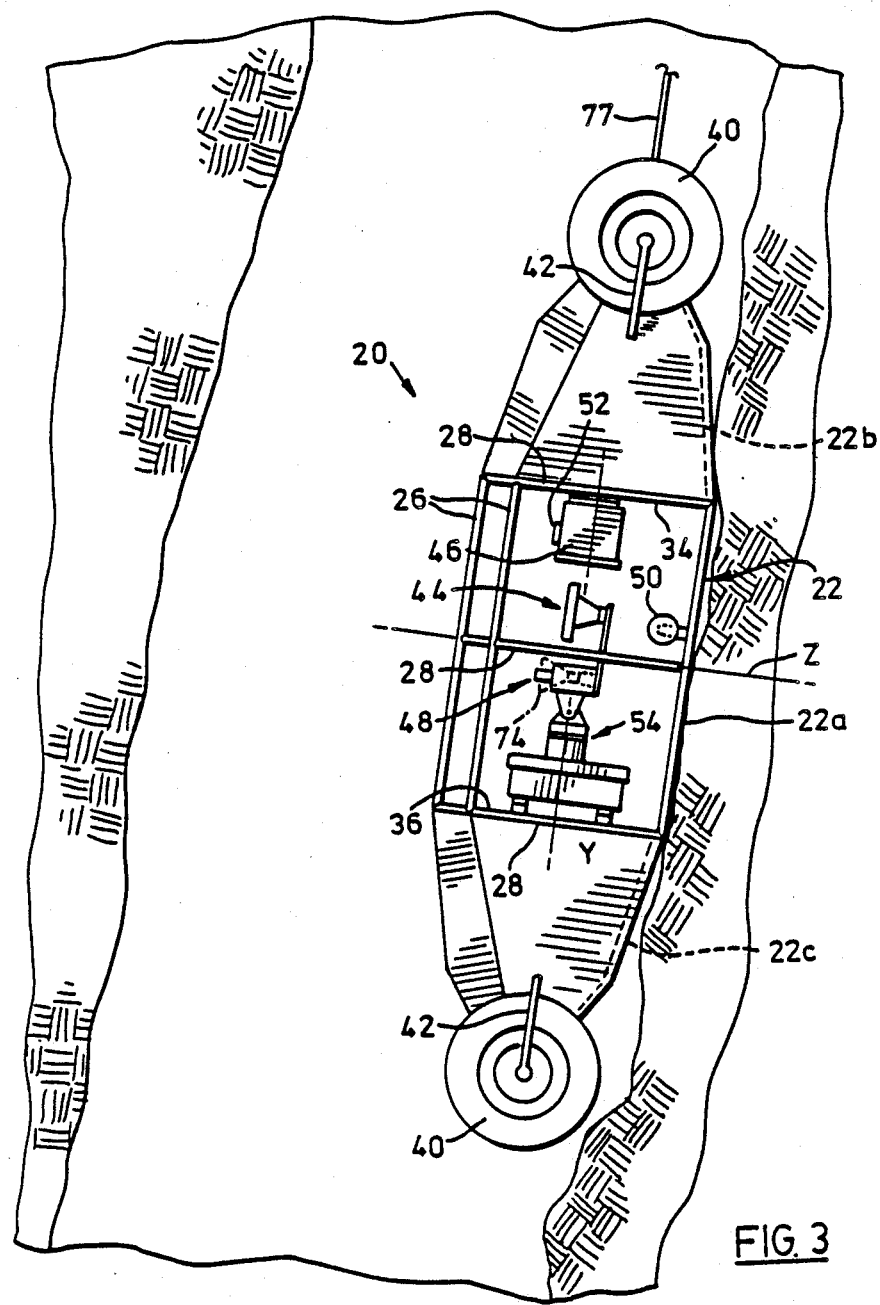
FIG. 3 is a diagrammatic side elevational view of the pod shown positioned in a subterranean passage; and, FIGS. 4 and 5 are charts showing the results of an actual typical profile run obtained using the apparatus shown in the previous views.

As discussed previously, the method of the invention relies on an instrument pod that travels along a passageway, the profile of which is to be determined. The pod itself is shown in FIGS. 2 and 3 of the drawings and the equipment carried by the pod and associated remote monitoring and recording equipment are shown in FIG. 1. Referring first to FIG. 2, the pod is generally denoted by reference numeral 20 and takes the form of a wheeled skid platform provided with a protective cage for the monitoring equipment carried by the pod. The particular pod shown is designed to be used in inclined or even vertical passes in a mine and the intention is that the pod will be lowered down or pulled up the pass. As such, the pod must be of quite robust construction and capable of negotiating extremely rough surfaces while at the same time protecting the monitoring equipment carried by the pod. While the exact design is not believed to be critical, the pod shown has been found to operate satisfactorily in tests.

The pod has a base plate 22 at the side that is intended to be the bottom of the pod; that is, the side closest to the back face or "floor" of the pass when the pod is in use. Plate 22 has a flat centre section 22a and end sections 22b and 22c that are inclined upwardly from the centre section. Steel tubes are welded to plate 22 to form the cage referred to previously. These tubes include hoops 24 that extend upwardly from and at either end of the centre section 22a of plate 22 and longitudinal tubes 26 that are welded to the ends of plate 22 and to the tubes 24. Additional bracing tubes indicated at 28 are also provided. Some of the tubes have been broken away in FIG. 2 for clarity of illustration. As best seen in FIG. 3, the longitudinal tubes 26 are also inclined inwardly towards the ends of the pod so that the overall shape of the pod has similar inwardly tapering leading and trailing ends. As seen in plan, the pod is also tapered inwardly at its ends (FIG. 2).

The cage formed by the tubes 24, 26 and 28 is clad with steel plate except in the centre section of the pod above the part of the base plate denoted 22a. The cladding (denoted 29) is welded to the tubular frame except for front and rear access plates denoted 30 and 32 in FIG. 2, which are secured by screws.

Bulkheads 34 and 36 are formed by further plates that are welded to the tubes of the cage at opposite ends of the centre section of the pod. These bulkheads carry the electronic equipment discussed previously.

Stub axles indicated at 38 are welded externally to the pod at its ends and carry rubber tired wheels 40. The stub axles are braced by struts 42 that extend between outer ends of the stub axles and the main body of the pod.

While it is not considered essential that the pod be provided with wheels and/or cladding, they are believed desirable. A pod without wheels or cladding was found to have a tendency to "hang up" and snag on obstructions within the passage.

By way of example, the particular pod illustrated was fabricated from one inch mild steel tube and one sixteenth inch mild steel plate. Twelve inch rubber tired wheels were used. The dimensions of the pod were: length—96"; width—40"; depth—23". The weight of the pod was approximately 350 lbs. Other, lighter materials such as aluminum could be used but are not as readily available or as easily weldable as mild steel.

FIG. 1 diagramatically illustrates the equipment carried by the pod (see the lower portion of FIG. 1) and the control and monitoring equipment that will be located remotely from the pod (see the upper part of FIG. 1). In this embodiment, the pod carries an ultrasonic rangefinder having a sensing head 44 and associated controller 46, a TV camera 48 and associated lights (not shown in FIG. 1) and two clinometers 50 and 52. The ultrasonic head 44 and TV camera 48 are both mounted on a pan-tilt assembly controller 54. Controller 54 is secured to the bulkhead 36 of FIGS. 2 and 3. This equipment is connected by cables to the control and monitoring equipment shown at the top of FIG. 1, all of which will be remotely located. This equipment includes a range read-out meter 56 and a digital recorder 58 for the rangefinder, a TV monitor 60 and associated video cassette recorder 62, clinometer readout meters 64 and 66 and a remote pan-tilt controller 68 having a control joystick 70.

FIGS. 2 and 3 show the pan-tilt assembly controller 54 mounted on the bulkhead 36. FIG. 2 also shows y, x and z axes of the pod. Controller 54 allows the ultrasonic head 44 and camera 48 to pan in planes normal to the longitudinal axis (y) and also to tilt with respect to that plane, for scanning the wall of a passage through which the pod is being moved. The rangefinder is capable of determining the distances from axis y of multiple points on the internal wall of the passage lying in a common plane normal to axis y. This is done by positioning the head at a fixed angle such as (but not necessarily) 90° to the y-axis (zero-tilt—see FIGS. 2 and 3) and then panning by means of controller 44, through defined angular ranges to opposite sides of the straight ahead position (on axis z). In practice, it has been found that scanning 90° to either side of the straight ahead position is satisfactory. Scanning using the ultrasonic head would normally be done in the zero-tilt position but the tilt facility is useful for directing the TV camera as required for visually inspecting the wall of the passage. Scanning of the wall using the ultrasonic head could also be conducted other than at the zero-tilt angle.

FIG. 2 also shows two spotlights 72 and 74 that are mounted one on either side of the TV camera 48 for providing the illumination required by the camera. Additional lights could of course be provided, for example, on the pod itself.

As noted previously, two clinometers 50 and 52 are provided. In this embodiment, the clinometers monitor rotation of the pod forward and backward about the x-axis and side-to-side about the z-axis. Monitoring of rotation of the pod about its y-axis was not done in this embodiment although an additional clinometer for this purpose could be added. Clinometer 50 monitors rotation about the z-axis and is mounted on bulkhead 36 while clinometer 52 measures rotation about the x-axis and is mounted on the case of the rangefinder controller 46 on bulkhead 34.

In this particular embodiment, the ultrasonic rangefinder was a "Milltronics Midranger" (trade mark) having a range of 0 to 60 feet, an accuracy of ±1% and an output of 4 to 20 milliamperes. The ultrasonic head 44 and the controller 46 are both designed to be field mounted in an industrial environment.

Meter 56 was a multimeter used to provide a raw distance measurement directly in milliamperes. The signal was simultaneously recorded on a digital recorder 58 (RUSTRAK by Gulton). The record was dumped onto an IBM PC following the profiling run, for further interpretation.

Sperry clinometers were used, having a range of ±0 to 60 degrees and an accuracy of ±0.1 degree. They require a power supply of ±12 volts DC and provide a direct readout in degrees.

The TV system included a camera, a monitor and pan-tilt assembly controller manufactured by Panasonic. The VCR unit was a VHS format unit designed for home use. The camera was a model 1410 CCTV camera and the monitor was a model TR 930 with a 9 inch screen.

The pan-tilt controller was capable of an angle of pan of between 10° and 340° and an up/down tilt angle of ±45°.

Two 150 watt spotlights were used to provide illumination for the camera.

Electrical and electronic components within the pod are connected to the remote control and monitoring equipment by a bundle of electrical conductors (umbilical cable) that is brought into the pod through an opening (not shown) at the top of the pod as seen in FIG. 2. An eye for attachment of a lifting or lowering cable for moving the pod through the passage is visible in FIG. 2 at 76 and is adjacent the opening for the conductors. A similar eye is also present at the opposite end of the pod. As noted previously, the pod is designed to be lowered down or pulled up a passage by a winch or tugger in this embodiment. In preparation for a profiling run, the tugger cable 77 (FIG. 2) is attached to the eye 76 and the bundle of electrical connectors (not shown) is brought into the pod and connected to the electrical/electronic components. Simultaneously, the control console is set up near the entrance to the passage. The response of the ultrasonic rangefinder and the clinometers are checked. Both of these instruments are calibrated on the surface before each run. The video system is checked for acceptable picture reception. The pan-tilt assembly is pre-tested to ensure that its drive mechanism is operating smoothly and that 180° of rotation can be achieved. Immediately prior to commencing a run, the lighting system is turned on and the focus and aperture of the camera are adjusted to provide the best picture quality.

Assuming that the pod is being lowered down a pass, the distance travelled is monitored by manually taking readings using a surveyors tape which is attached to the top of the pod. At every ten foot intervals, movement is arrested and a profiling scan is made. Both the camera and the ultrasonic head are rotated through 180°. A zero-degree point is defined as being directly in front of the pod (on the z-axis). Scanning occurs ±90° from the zero point in a single plane. Ultrasonic rangefinder measurements are recorded every 15 degrees. In defined problem areas, the vertical distance between scans may be less than 10 feet and the rangefinder measurements may be made in angular increments smaller than 15 degrees.

A scale graduated in degrees (not shown) may be attached to the pod frame within the field of view of the camera so that the viewing angle can be measured from the scale. Alternatively, the viewing angle may be determined from the control unit for the pan-tilt assembly controller.

Clinometer readings are taken during each scan to determine the exact orientation of the pod: Observation of the clinometer readings as the vehicle is moving down the passage helps determine if the pod is rotating about its y-axis. Over-rotation about this axis will result in the pod rolling over and sliding down the passage on its face.

Figure 4:
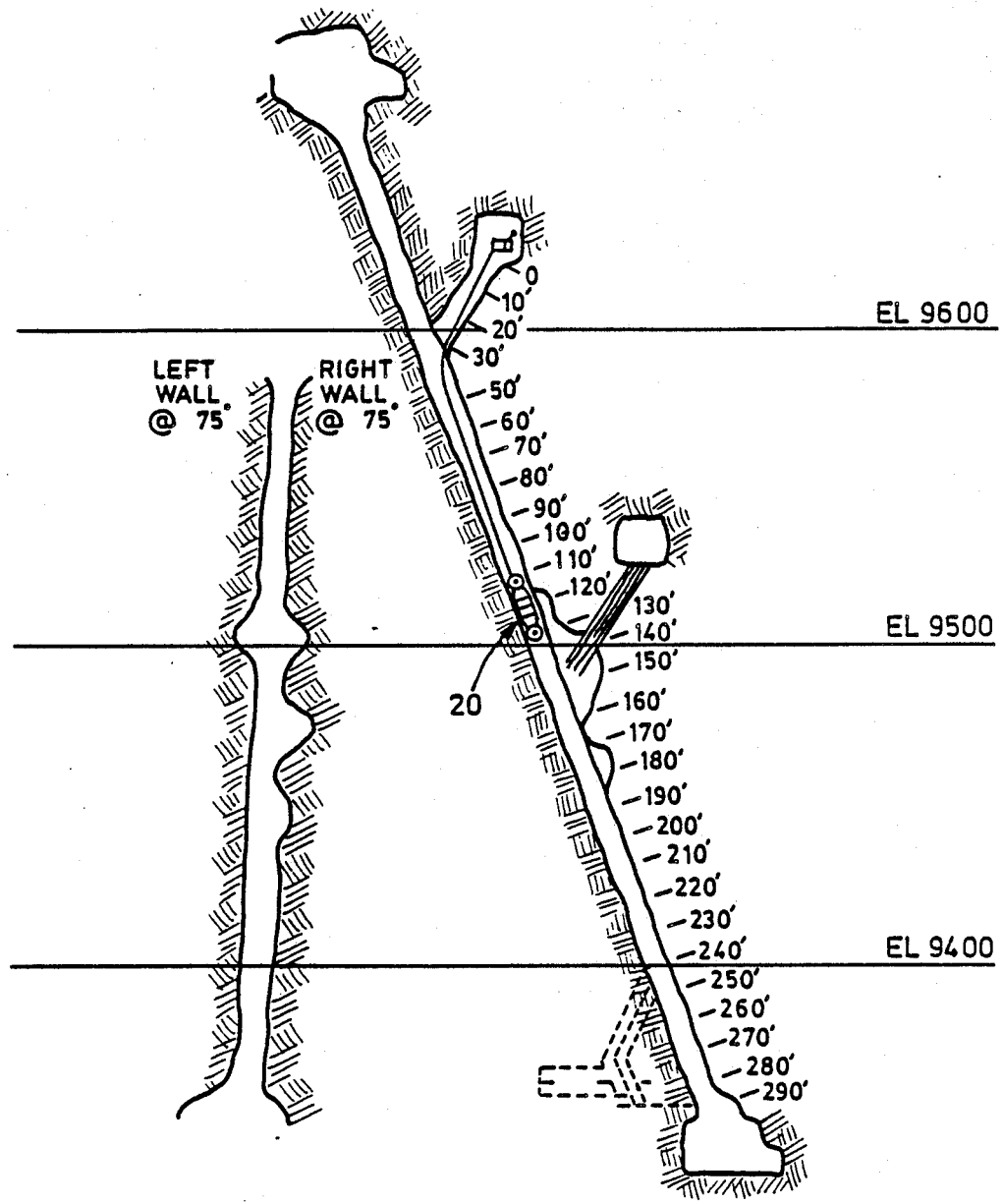
Figure 5:
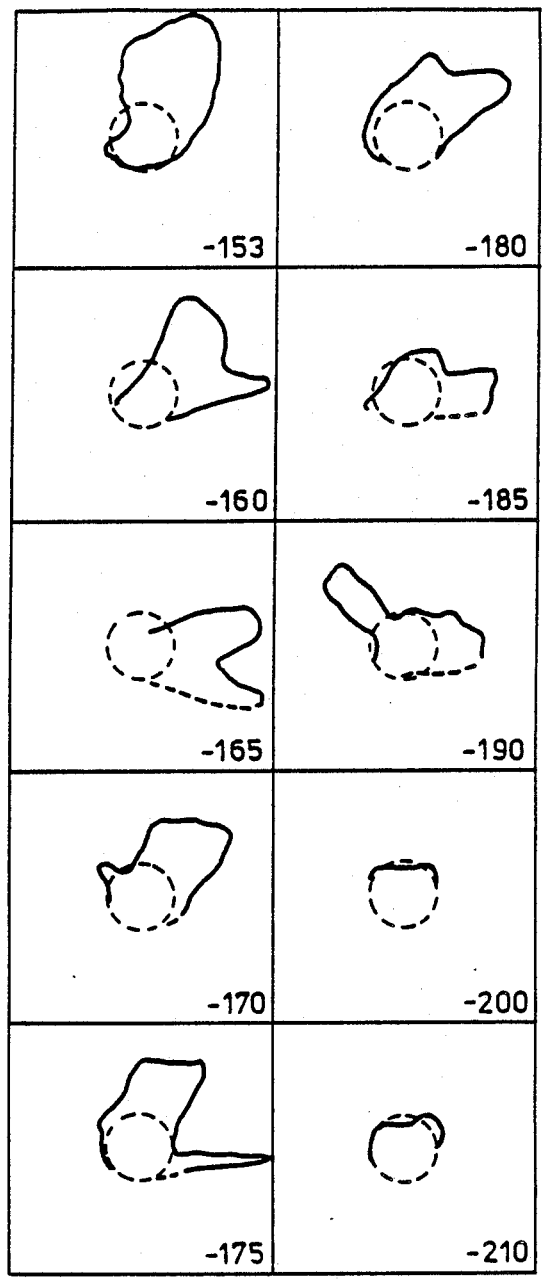

The results of a typical profiling run appear in FIGS. 4 and 5. The example used is the contour of a waste pass between two levels of an ore mine. FIG. 4 presents a section through this area that includes the results of the profiling. The right-hand sectional view is marked with each location at which a profile was taken and gives the contol of the waste past directly in front of the pod at zero degrees (i.e. as seen in a plane normal to the y-axis of the pod). The lefthand sectional view gives the contours of the waste pass to the right and left of the pod at ±75°. FIG. 5 presents plan views at different elevations and shows the actual plotted outline of the walls of the pass. The orientation of the pod is represented by the line drawn through each view.

It will of course be appreciated that the preceding description relates to a particular preferred embodiment of the invention only and that many modifications are possible within the broad scope of the invention. Some of those modifications have been indicated previously and others are noted below.

For example, in situations in which visual inspection of the wall of the passage is not required, the TV camera and associated equipment may be omitted. Where a TV camera is employed, a system having the facility for remote adjustment of the aperture and focus of the camera would be desirable.

The particular rangefinder used had a range of 0 to 60 feet. A greater range would probably be desirable at least for some applications. It may also be possible to use rangefinders other than ultrasonic rangefinders. For example, laser rangefinders might be used in principle although present designs are probably too susceptible to shock and impact damage to be sufficiently durable for use in this particular application.

Instead of using a rangefinder that is designed to scan the wall of the passage, it may be conceivable to use a rangefinder having multiple heads that would simultaneously determine the range of a plurality of different points on the wall of the passage.

Finally, it should be noted that, although the preceding description relates to a pod that is designed to be lowered down or pulled up the passage, it would be possible for the pod to be self-propelled, for example where the pod is designed to be used in a generally horizontal passage.

We claim:

1. A method of remotely determining the profile of a subterranean passage, comprising the steps of:
   providing an instrument pod that is capable of being moved along the passage and that includes: rangefinder means capable of determining the distances from a defined longitudinal axis of the pod of multiple points on the internal wall of the passage lying in a common plane normal to said axis, and of providing an output signal indicative of said distances and representing the profile of the passage in said plane; and clinometer means capable of providing an output signal indicative of the orientation of the pod in the passageway;
   positioning said pod at a known location in a passage the profile of which is to be determined;
   remotely monitoring the output signals of the rangefinder means and clinometer means;
   generating from the output signal of the rangefinder means a visual representation of the profile of the passage at said known location;
   moving the pod to successive subsequent locations each at a known distance along the passage from a preceding location, the pod being of a robust construction permitting said movement of the pod through an inclined said passage in contact with a wall thereof and said pod including means protecting said rangefinder means and clinometer means against damage due to impacts with said passage wall, the pod comprising a skid platform having a bottom surface defined by a skid plate, and a frame coupled to said skid plate and defining a cage surrounding said rangefinder means and clinometer means; said skid platform and frame providing said robust construction and said protecting means;

at each said subsequent location, generating a visual representation of the profile of the passage from the rangefinder output signal.

2. A method as claimed in claim 1, wherein said rangefinder means comprises a directional rangefinder and means for scanning said multiple points on the internal wall of the passage, and wherein the method comprises the further step of performing said scanning in incremental steps at each said location and measuring the distance of a said point at each step.

3. A method as claimed in claim 1, wherein the pod further includes a television camera and associated lighting equipment for providing a television picture output, and means for causing the television camera to scan the internal wall of the passage, and wherein the method comprises the further step of remotely monitoring said television output for visually inspecting the wall of the passage.

4. A method as claimed in claim 1, wherein said clinometer means comprises first and second clinometers positioned to monitor respectively rotation of the pod about an x-axis extending normal to said longitudinal axis and laterally of the pod, and about a z-axis extending normal to the longitudinal axis and x-axis.

5. A method as claimed in claim 1, wherein said pod comprises a skid platform having a bottom surface defined by a skid plate, and a frame coupled to said skid plate and defining a cage surrounding said rangefinder means and clinometer means; said skid platform and frame providing said robust construction and said protecting means.

6. An instrument pod for use in a method of remotely determining the profile of a subterranean passage, the pod being capable of being moved along the passage and including: rangefinder means capable of determining the distances from a defined longitudinal axis of the pod multiple points on the internal wall of the passage lying in a common plane normal to said axis, and of providing to a remote monitoring location an output signal indicative of said distances and representing the profile of a passage in said plane; and clinometer means capable of providing an output signal to said remote location indicative of the orientation of the pod in the passage in use; said pod being of a robust construction permitting movement of the pod through an inclined said passage in contact with a wall thereof and including means protecting said rangefinder means and clinometer means against damage due to impacts with said passage wall; and wherein the pod comprises a skid platform having a bottom surface defined by a skid plate, and a frame coupled to said skid plate and defining a cage surrounding said rangefinder means and clinometer means; said skid platform and frame providing said robust construction and said protecting means.

7. A pod as claimed in claim 6, wherein said pod comprises a skid platform having a bottom surface defined by a skid plate, and a frame coupled to said skid plate and defining a cage surrounding said rangefinder means and clinometer means; said skid platform and frame providing said robust construction and said protecting means.

8. Apparatus for remotely determining the profile of a subterranean passage comprising:
an instrument pod as claimed in claim 6; and,
means for remotely monitoring the output signals of the rangefinder means and the clinometer means.

9. Apparatus as claimed in claim 8, wherein said rangefinder means includes a directional ultrasonic rangefinder head and means for causing the rangefinder to scan said multiple points on the internal wall of the passage under remote control when the pod is at a defined location in the passage at which the profile of the passage is to be determined.

10. An apparatus as claimed in claim 9, wherein said means for causing the rangefinder to scan comprises a pan-tilt assembly controller supporting said ultrasonic head in the pod and remote pan-tilt control means adapted to operate said controller from a remote location.

11. An apparatus as claimed in claim 10, further comprising a television camera and associated lighting means carried by said pan-tilt assembly controller for scanning the wall of the passage during said scanning of the ultrasonic head, and a monitor for positioning at a remote location and adapted to receive television pictures from said camera.

12. An apparatus as claimed in claim 9, wherein said means for causing the rangefinder to scan is adapted to permit scanning in incremental angular amounts and wherein said means for remotely monitoring the rangefinder comprises a range readout meter for providing a reading of the distance of a point on the internal wall of the passage from said defined longitudinal axis of the pod at each of said incremental angular positions of scan, and means for recording said range readout signals.

13. An apparatus as claimed in claim 8, wherein said clinometer means comprises first and second clinometers positioned on said pod to monitor rotation of the pod about an x-axis disposed normal to said longitudinal axis of the pod and laterally thereof, and about a z-axis normal to said longitudinal axis and said x-axis and wherein said means for remotely monitoring output signals from the clinometer means comprises the first and second clinometer readout devices, each responsive to the associated clinometer.

14. An apparatus as claimed in claim 8, wherein said skid is provided with front and rear pairs of wheels for facilitating movement of the pod through a passageway and protective cladding carried by said frame clear of said rangefinder means.

15. An apparatus as claimed in claim 8, further comprising a control console adapated to be positioned at a location remote from the pod and connected to the pod by an umbilical cable permitting movement of the pod along the passage, the console including said means for remotely monitoring the output signals of the rangefinder means and the clinometer means.

16. An apparatus as claimed in claim 15, wherein the rangefinder means includes a directional ultrasonic rangefinder head and a pan-tilt assembly controller supporting said ultrasonic head in the pod for causing the head to scan said multiple points on the internal wall of the passage, and wherein the apparatus includes a television camera and associated lighting means carried by said pan-tilt assembly controller for scanning the wall of the passage during said scanning of the ultrasonic head; remote pan-tilt control means adapted to operate said controller from said remote location; and a monitor adapted to receive television pictures from said camera; said pan-tilt control means and monitor forming part of said console and being coupled to the pod by said umbilical cable.

* * * * *